Figure 1:
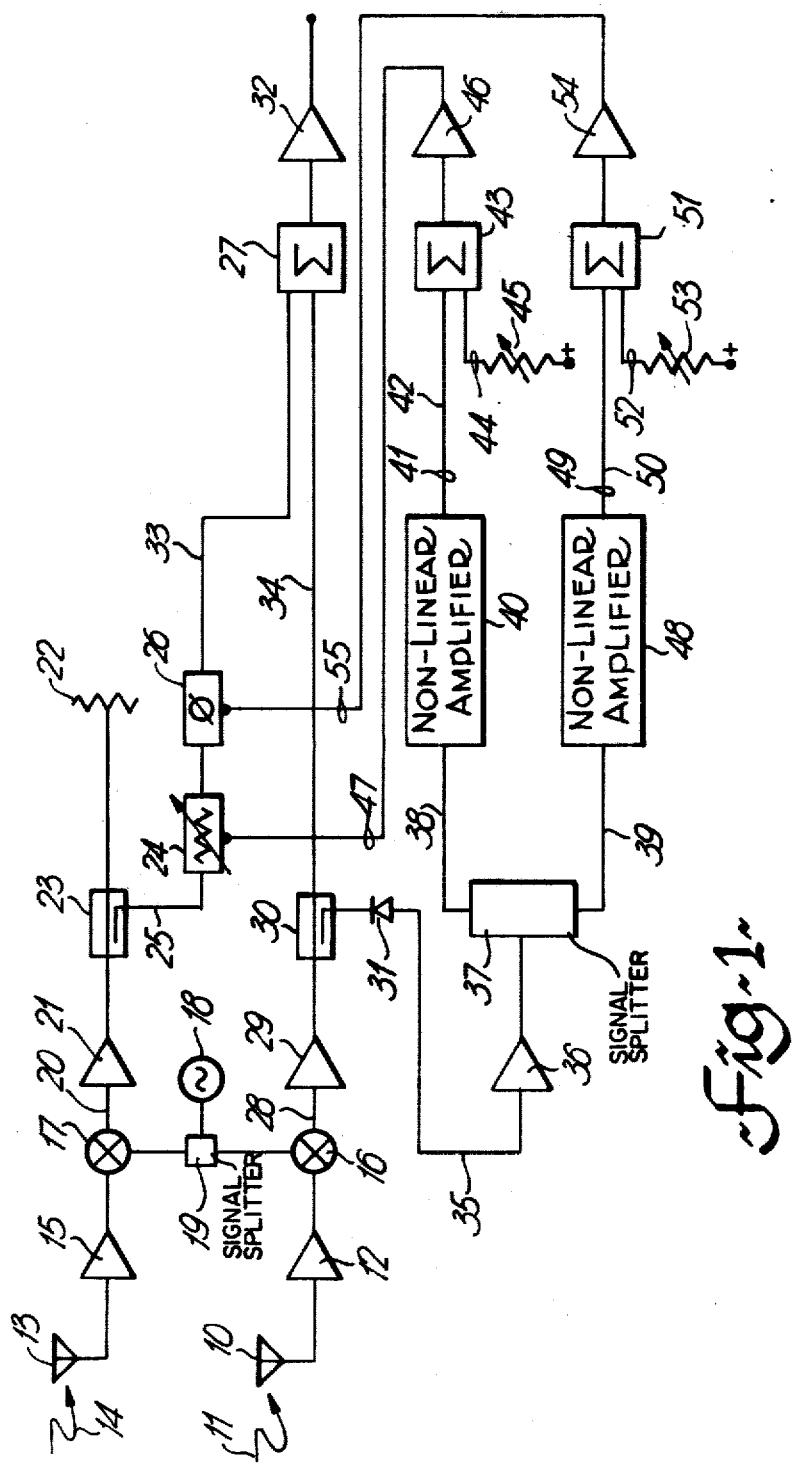

United States Patent [19]

Lo et al.

[11] 4,313,220

[45] Jan. 26, 1982

[54] CIRCUIT AND METHOD FOR REDUCING POLARIZATION CROSSTALK CAUSED BY RAINFALL

[75] Inventors: Gerald J. P. Lo; Wayne L. Nowland; Anthony N. Shelton, all of Ottawa, Canada

[73] Assignee: Northern Telecom Limited, Montreal, Canada

[21] Appl. No.: 882,999

[22] Filed: Mar. 3, 1978

[30] Foreign Application Priority Data

Jan. 23, 1978 [CA] Canada .................................. 295471

[51] Int. Cl.³ .......................................... H04B 7/10
[52] U.S. Cl. ................................... 455/304; 455/305; 455/60; 343/100 PE; 370/6
[58] Field of Search .............. 325/22, 23, 24, 59, 325/60, 56, 472, 474, 475, 476, 479; 343/100 CS, 100 PE, 100 AD; 179/15 AN, 15 BC; 455/59, 60, 276, 278, 303, 304, 305; 370/6, 20; 375/39, 58, 102

[56] References Cited

U.S. PATENT DOCUMENTS

| | | | |
|---|---|---|---|
| 3,430,156 | 2/1969 | Katzin | 325/56 X |
| 3,883,872 | 5/1975 | Fletcher | 343/100 PE |
| 4,027,105 | 5/1977 | Kannowade | 179/15 BC |
| 4,090,137 | 5/1978 | Soma et al. | 325/60 |

OTHER PUBLICATIONS

Comsat Review vol. 6, No. 2, Fall 1966, pp. 253–283, "Adaptive Polarization Control for Satellite Frequency Reuse Systems".

Bell System Technical Journal, vol. 53, No. 8, Oct. 1974, "Rain-Induced Cross-Polarization at Centimeter and Millimeter Wavelengths", by T. S. Chu.

Spectrum Reuse by Adaptive Polarization Separation, B. D. Cullen et al.; Harris Corp., P.O. Box 37; Melbourne, Fla., 32901, 1975, Telecommunications Conference.

Primary Examiner—Benedict V. Safourek
Attorney, Agent, or Firm—Robert C. Hogeboom

[57] ABSTRACT

A circuit for reducing the effects of polarization crosstalk occurring on a first RF signal due to a second RF signal, wherein the first and the second RF signals are two approximately orthogonally polarized RF signals having essentially the same frequency. The circuit comprises a first antenna and a first signal path (including RF and IF sections) for the first RF signal and a second antenna and a second signal path (including RF and IF sections) for the second RF signals. A first coupler diverts a portion of the signal on the second signal path into a first network comprising the series combination of a variable attenuator and a variable phase shifter. A summing circuit sums both the signal on the first signal path and the signal output from the first network with the result that the undesired signal on the first signal path is reduced. A logic circuit, responsive to the magnitude of one of the RF signals, controls the first network according to a predetermined relationship.

12 Claims, 1 Drawing Figure

CIRCUIT AND METHOD FOR REDUCING POLARIZATION CROSSTALK CAUSED BY RAINFALL

The present invention relates to rain depolarization in communication links, particularly satellite to ground communications, and more particularly, to a novel manner of reducing polarization crosstalk between two signals being received at a ground station.

As the frequency spectrum becomes more and more crowded, various ways and means are devised to make more efficient use of the available spectrum. One of these methods, employed in satellite to ground communications, is the use of dual-polarized communication links, also referred to as "spectrum re-use". In spectrum re-use, the available bandwidth is re-used by transmitting two independent signals on a single radio frequency by using dual polarization. Dual polarization comprises transmitting two orthogonally oriented signals. This theoretically results in a doubling of communication channels, as long as the polarized signals preserve their orthogonality (or a sufficient degree of orthogonality). The lack of "pure" orthogonal polarization (i.e. depolarization) will result in a coupling between the two communication channels which has been called "polarization crosstalk".

Polarization crosstalk between orthogonally polarized signals is introduced by imperfections in either or both of the transmitting and the receiving antennas, and the medium; the dominant contributor being the medium. One of the major elements of the medium to cause polarization crosstalk is rainfall. Orthogonal polarization components experience differential phase shift and attentuation due to the oblate nature of raindrops. This problem is well recognized in the art and solutions have been proposed to solve it. The articles "Adaptive Polarization Control For Satellite Frequency Reuse Systems" by D. F. DiFonzo, W. S. Trachtman, and A. E. Williams in *COMSAT Review* pages 253–283, Vol. 6, No. 2, Fall 1976 and "Spectrum Reuse by Adaptive Polarization Separation" by B. D. Cullen, A. Giantasio, G. Pelchat, and L. R. Young in 1975 *National Telecommunications Conference*, pages 43-18 to 43-25 address themselves to solving this problem.

Both of the foregoing articles employ the use of pilot signals to achieve orthogonality correction and thereby reduce the polarization crosstalk. The articles by B. D. Cullen et al also mentions alternatives to the pilot signal technique (i.e. Carrier Offset Frequency, Known Pattern Injection, and Decision Voltage Signal-to-Noise Ratio, all on page 43-22).

Stated in rather simplistic terms, the prior art method of detecting polarization crosstalk employing pilot signals works as follows. A pilot signal having frequency A is transmitted on polarization 1, and a pilot signal having frequency B is transmitted on polarization 2, which is orthogonal to polarization 1. At the receive end, if perfect orthogonality and separation is maintained throughout the transmission path, the pilot signal with a frequency A should be detected on polarization 1 and be absent from polarization 2; similarly, the pilot signal having a frequency B should be detected on polarization 2 and be absent from polarization 1. If one pilot signal (e.g. frequency A) is detected on both polarizations 1 and 2, then this is an indication of polarization crosstalk.

In the prior art, orthogonality correction is applied according to the following general method. A small portion of the signal appearing on polarization 2 is diverted and is passed through a variable attenuator and through a variable phase shifter and is then added to the signal appearing on polarization 1, thereby cancelling (at least partially) that component of polarization 2 appearing on polarization 1. The variable attenuator and the variable phase shifter are controlled by signals derived from monitoring the output of polarization 1 (after correction) for the presence of the pilot signal with frequency B (i.e. the performance of the correction is monitored). This method can be used in the RF (radio frequency) portion of the receiver or in the IF (intermediate frequency) portion of the receiver. Correction for polarization 2 is accomplished in an analogous manner. This method assumes that the undesired signal on one polarization is completely correlated with the desired signal on the other polarization. More details and formulae regarding this corrective technique can be found in the aforementioned articles by D. F. DiFonzo et al and by B. D. Cullen et al, and attention is directed to them.

An article entitled "Phase of Crosspolarized Signals on Microwave Satellite Links" by N. J. McEwan appearing in *Electronics Letters*, Aug. 4, 1977, Vol. 13, No. 16 describes a system differing from that of the aforementioned prior art, in that it only controls the amplitude of the "cancellation" signal, and not its phase (i.e. a one parameter corrective system). Such a system is possible since N. J. McEwan is primarily concerned with polarization crosstalk caused by ice crystals. N. J. McEwan states that when the polarization crosstalk is caused by ice crystals, a one-parameter adaptive cancellation system injecting a pure quadrature cancellation signal produces acceptable results. The article is silent on the method for controlling the operation of this one-parameter cancellation system.

The subject matter of the present invention is similar to that of the prior art discussed above, in that the general object is the same (i.e. to reduce polarization crosstalk) and the portion of the circuit for applying the corrective means is the same as that found in the prior art. The difference between the present invention and the prior art lies in how the corrective apparatus (i.e. the variable attenuators and variable phase shifters) of the prior art is controlled to produce the desired results.

Considering orthogonally polarized RF signals, the phase and amplitude of the cross-polarized unwanted signal, relative to the main (desired) signal, is directly related, during a rainfall, to the amount of fade in the main signal. Depolarization studies carried out by BNR (Bell-Northern Research) and CRC (Communications Research Centre) of the Department of Communications have shown that this relationship between the various parameters is, by and large, valid for most rainfall situations. Thus, on a statistical basis, one can predict the amount of interference cancellation required during a rainfall, by measuring the amount of fade of the main signal. The present invention takes advantage of this fact and monitors the magnitude of the main signal. Suitable logic circuitry, responsive to the magnitude of the main signal, is employed to control the variable attenuators and variable phase shifters, described in the prior art, to provide a predetermined amount of cancellation dependent upon the magnitude of the main signal.

It should be noted that such a technique requires a relatively constant transmitter power output. It should also be noted that a correction scheme of this type is not expected to be 100% perfect; other factors, besides rainfall, may cause a change in the magnitude of the main signal. Additionally, as previously noted, this scheme is based upon statistical methods, and as such, may seldom (or never) produce a perfect result, but it will usually produce an improved result. It should be noted also that this scheme does not require any special pilot signals.

Briefly stated, one embodiment of the present invention comprises a circuit for reducing the effects of polarization crosstalk occurring on a first RF signal due to a second RF signal wherein the first and second RF signals are two approximately orthogonally polarized RF signals having essentially the same frequency. In simplistic terms, a portion of the second RF signal is summed, via the series combination of an adjustable attenuator and an adjustable phase shifter, with the first RF signal so as to reduce that component of the second RF signal appearing superimposed upon the first RF signal. The adjustable attenuator and the adjustable phase shifter are operated, in a predetermined manner, in response to the magnitude of either the first or the second RF signal.

A further embodiment of the present invention comprises a circuit for reducing the effects of polarization crosstalk occurring on a first RF signal due to a second RF signal, wherein the first and second RF signals are two approximately orthogonally polarized RF signals having essentially the same frequency, and wherein, after reception by suitable antenna means the first RF signal follows a first signal path including both RF and IF sections, and the second RF signal follows a second signal path including both RF and IF sections; a portion of the signal in the second signal path is passed through the series combination of a variable attenuator and a variable phase shifter, and the resultant signal is added to the first signal path so as to at least partially cancel portions of the signal from the second signal path that appear superimposed upon the signal of the first signal path, the circuit characterized by: logic means for controlling both the variable attenuator and the variable phase shifter in a predetermined manner in response to the magnitude of one of the RF signals.

Yet another embodiment of the present invention comprises a circuit for reducing the effects of polarization crosstalk occurring on a first RF signal due to a second RF signal, wherein the first and second RF signals are two approximately orthogonally polarized RF signals having essentially the same frequency, the circuit comprising: a first antenna means and a first signal path for the first RF signal, the first path comprising both RF and IF sections; a second antenna means and a second signal path for the second RF signal, the second path comprising both RF and IF sections; a first coupler means for diverting a portion of the signal on the second signal path into a first network comprising the series combination of a variable attenuator and a variable phase shifter; a summing means for summing both the signal on the first signal path and the signal output from the first network; a magnitude sensing means for sensing the magnitude of one of the RF signals and for producing a signal indicative of the magnitude thereof; logic means, responsive to the signal from the magnitude sensing means, for controlling the first network according to a predetermined relationship.

The invention will now be described in more detail with reference to the accompanying single FIGURE which is a simplified block diagram of the preferred embodiment of the present invention.

An antenna 10 intercepts a first radio frequency (RF) signal 11 as depicted in FIG. 1. RF signal 11 is applied to a low noise amplifier (LNA) 12 by antenna 10. In a similar fashion antenna 13 intercepts a second RF signal 14 and applies it to a low noise amplifier 15. The output of amplifier 12 is applied to mixer 16 and the output of amplifier 15 is applied to mixer 17. A signal from local oscillator 18 is split into two portions of approximately equal magnitude by signal splitter 19; one portion is fed to mixer 16, the other portion to mixer 17. The output of mixer 17 on line 10, is an intermediate frequency (IF) signal. The signal on line 20 is applied to an IF amplifier 21, which in turn feeds the signal to a load 22, via coupler 23. As the actual load for this portion of the circuit is not vital to an understanding of the invention, it has been shown symbolically as a resistor (in the interests of simplicity) and indicated by the reference character 22.

Coupler 23 allows a small portion of the signal passing from amplifier 21 to load 22 to be diverted to variable IF attenuator 24 (e.g. a series AE-27 by Merrimac Industries) via line 25. Typically, the level of the signal so diverted to attenuator 24 will be approximately 6 db below the output level of amplifier 21. The output of attenuator 24 is applied to variable phase shifter 26 (e.g. a series PSES-3 by Merrimac Industries), and the output of phase shifter 26 is applied, via line 33, to summing circuit 27, and the output of circuit 27 is applied to IF amplifier 32.

Returning to mixer 16, the output of mixer 16, on line 28, is an intermediate frequency (IF) signal. The signal on line 28 is applied to an IF amplifier 29, which in turn feeds the signal to a coupler 30. The bulk of the signal applied to coupler 30 is fed to summing circuit 27 via line 34, but a small portion (typically 6 to 10 db down from the input signal applied to coupler 30) is fed to crystal diode detector 31. Detector 31 and its associated circuitry will be discussed later, in more detail.

The first RF signal 11 has essentially the same frequency as does second RF signal 14 (e.g. 4GHz) and the signals 11 and 14 are approximately orthogonally polarized. In the block diagram of FIG. 1, it is desired to detect the information carried by RF signal 11. The signal received at antenna 10 will be largely RF signal 11 (due to antenna polarization) but a certain portion of the signal received by antenna 10 will also be RF signal 14, due partially to imperfections in antenna 10 and, during periods of precipitation, due to polarization crosstalk caused by rainfall.

As stated previously, it is known in the prior art to reduce this polarization crosstalk by employing coupler 23, IF attenuator 24, phase shifter 26, and summing circuit 27. Briefly stated, in simplistic terms, this prior art method comprises taking a portion of the interfering signal (i.e. RF signal 14) from the IF (e.g. 70 MHz) portion of its receive circuitry (i.e. the output of coupler 23 on line 25). This signal is then adjusted in magnitude (via IF attenuator 24) and adjusted in phase (via phase shifter 26) so that when the resultant signal on line 33 is applied to summing circuit 27 and summed with the desired RF signal 11 (now in the IF portion of its receive circuitry and on line 34) the interfering signal superimposed on RF signal 11 due to polarization crosstalk is theoretically cancelled by the signal on line 33. The corrected IF signal from summing circuit 27 is then applied to IF amplifier 32, and the remainder of the receiver circuitry (not shown) functions in a conventional manner and is not pertinent to a discussion of the present invention.

As noted previously, the novel subject matter of this invention resides in the control of IF attenuator 24 and phase shifter 26. The control of these two devices, according to the preferred embodiment of the present invention, will now be described. Crystal diode detector 31 rectifies the IF voltage it receives from coupler 30 and produces, on line 35, a signal the magnitude of which is indicative of the magnitude of first RF signal 11. The signal on line 35 is applied to linear amplifier 36 which in turn applies its output signal to signal splitter 37. Splitter 37 divides its input signal into two signals of approximately equal magnitude and outputs one signal on line 38 and the other on line 39.

Line 38 is connected to a non-linear amplifier 40. The response of amplifier 40 is designed to approximate the relationship between the attenuation (due to rainfall) of RF signal 11 and the magnitude of the polarization crosstalk. As stated previously, the amount of polarization crosstalk (due to rainfall) is directly related to the amount of fade (i.e. reduction in magnitude) of the main signal. On a statistical basis, one can predict the amount of interference cancellation required during a rainfall by measuring the amount of fade of the main signal (i.e. signal 11). The response of amplifier 40 is designed to approximate the relationship between the attenuation (due to rainfall) of RF signal 11 and the amount of magnitude correction required so that when the signal on line 33 is added to the signal on line 34, the polarization crosstalk is eliminated (or at least, reduced); i.e. the magnitude of the signal on line 33 is equal to the magnitude of the unwanted portion of the signal appearing on line 34. Signal 41 is applied to a summing circuit 43, where it is summed with a DC signal 44. Signal 44 is a DC voltage, the magnitude of which is set by variable resistor 45. Resistor 45 is employed to provide an adjustment that is set when there is no rainfall present (i.e. clear sky) in the path between the transmitter (not shown) and antenna 10. Resistor 45 provides for cancellation of polarization crosstalk due to effects other than rainfall (e.g. antenna imperfections); resistor 45 is set (under conditions of clear sky) for maximum cancellation or minimum polarization crosstalk and is then left along. The output signal from summing circuit 43 is applied to linear amplifier 46 and the output signal 47 from amplifier 46 is applied to IF attenuator 24 for control purposes. In summary, when RF signal 11 decreases in magnitude, it is assumed that the polarization crosstalk has increased and signal 47 (applied to IF attenuator 24) causes attenuator 24 to pass more signal to be used in cancelling out the effects of polarization crosstalk appearing on RF signal 11.

Returning now to signal splitter 37, line 39 is connected to a non-linear amplifier 48. The response of amplifier 48 is designed to approximate the relationship between the attenuation (due to rainfall) of RF signal 11 and the amount of phase correction required so that when the signal on line 33 is added to the signal on line 34, the polarization crosstalk is eliminated (or at least, reduced); i.e. the phase of the signal on line 33 is 180° out of phase with the unwanted portion of the signal appearing on line 34. Amplifier 48 produces a signal 49 on line 50.

Signal 49 is applied to a summing circuit 51, where it is summed with a DC signal 52. Signal 52 is a DC voltage, the magnitude of which is set by variable resistor 53. Resistor 53 is employed to provide an adjustment that is set when there is no rainfall present in the path between the transmitter (not shown) and antenna 10. Resistor 53 provides for correction of polarization crosstalk due to effects other than rainfall (e.g. antenna imperfections); resistor 53 is set (under conditions of clear sky) for maximum cancellation or minimum polarization crosstalk and is then left alone. The output from summing circuit 51 is applied to linear amplifier 54 and the output signal 55 from amplifier 54 is applied to phase shifter 26 for control purposes. In summary, when RF signal 11 decreases in magnitude, it is assumed that the polarization crosstalk has increased and signal 55 (applied to phase shifter 26) causes phase shifter 26 to shift the phase of the signal passing through itself so that the signal it passes is 180° out of phase with the unwanted portion of the signal appearing superimposed on RF signal 11.

What is claimed is:

1. In a circuit for reducing the effects of polarization crosstalk occurring on a first RF signal due to a second RF signal, wherein said first and second RF signals are two approximately orthogonally polarized RF signals having essentially the same frequency, and wherein, after reception by suitable antenna means said first RF signal follows a first signal path including both RF and IF sections, and said second RF signal follows a second signal path including both RF and IF sections; a portion of the signal in said second signal path is passed through the series combination of a variable attenuator and a variable phase shifter, and the resultant signal is added to said first signal path so as to at least partially cancel portions of signal from said second signal path that appear superimposed upon the signal of said first signal path, said circuit characterized by: logic means for controlling both said variable attenuator and said variable phase shifter in a predetermined manner in response to the magnitude of one of said RF signals.

2. The circuit of claim 1 wherein said variable attenuator and said variable phase shifter operate at IF frequencies.

3. The circuit of claim 2 wherein said logic means for controlling both said variable attenuator and said variable phase shifter is responsive to the magnitude of said first RF signal.

4. The circuit of claim 3 further including a magnitude sensing means both for sensing the magnitude of said first RF signal, and for producing a control signal to be applied to said logic means so that said logic means functions in response to the magnitude of said first RF signal according to a predetermined relationship.

5. A circuit for reducing the effects of polarization crosstalk occurring on a first RF signal due to a second RF signal, wherein said first and second RF signals are two approximately orthogonally polarized RF signals having essentially the same frequency, said circuit comprising:

a first antenna means and a first signal path for said first RF signal, said first path comprising both RF and IF sections;

a second antenna means and a second signal path for said second RF signal, said second path comprising both RF and IF sections;

a first coupler means for diverting a portion of the signal on said second signal path into a first network comprising the series combination of a variable attenuator and a variable phase shifter;

a summing means for summing both said signal on said first signal path and the signal output from said first network;

a magnitude sensing means for sensing the magnitude of one of said RF signals and for producing a signal indicative of the magnitude thereof;

logic means, responsive to said signal from said magnitude sensing means, for controlling said first network according to a predetermined relationship.

6. The circuit of claim 5 wherein said first coupler means, said variable attenuator, said variable phase shifter, and said summing means all operate in the IF frequency range.

7. The circuit of claim 6 wherein said magnitude sensing means senses the magnitude of said first RF signal in the IF section of said first signal path.

8. The circuit of claim 7 wherein said RF frequency is in the order of 4 GHz. and said IF frequency is in the order of 70 MHz.

9. In a method for reducing the effects of polarization crosstalk occurring on a first RF signal due to a second RF signal, wherein said first and second RF signals are two approximately orthogonally polarized RF signals having essentially the same frequency, and wherein, after reception by suitable antenna means said first RF signal follows a first signal path including both RF and IF sections, and said second RF signal follows a second signal path including both RF and IF sections; a portion of the signal in said second signal path is passed through the series combination of a variable attenuator and a variable phase shifter, and the resultant signal is added to said first signal path so as to at least partially cancel portions of signal from said second signal path that appear superimposed upon the signal of said first signal path, said method characterized by: controlling both said variable attenuator and said variable phase shifter in a predetermined manner in response to the magnitude of one of said RF signals.

10. The method of claim 9 wherein said variable attenuator and said variable phase shifter are operated in a predetermined manner in response to the magnitude of said first RF signal.

11. The circuit of claim 1, 3 or 4 wherein said polarization crosstalk is caused by rainfall.

12. The circuit of claim 5, 7 or 8 wherein said polarization crosstalk is caused by rainfall.

* * * * *